United States Patent [19]

Weikel et al.

[11] Patent Number: 4,467,314

[45] Date of Patent: Aug. 21, 1984

[54] ELECTRIC UTILITY COMMUNICATION SYSTEM WITH FIELD INSTALLATION TERMINAL AND LOAD MANAGEMENT TERMINAL WITH REMOTELY ASSIGNABLE UNIQUE ADDRESS

[75] Inventors: Scott J. Weikel; Theodore H. York, Jr., both of Raleigh, N.C.; Carl E. Yates, Chester, N.J.

[73] Assignee: Westinghouse Electric Corp., Pittsburgh, Pa.

[21] Appl. No.: 363,218

[22] Filed: Mar. 29, 1982

[51] Int. Cl.$^3$ .............................................. H04B 3/54
[52] U.S. Cl. .................................. 340/310 A; 307/40; 340/310 CP; 340/514; 340/825.22; 364/492
[58] Field of Search ......... 307/40; 340/310 A, 310 R, 340/310 CP, 825.04, 825.22, 505, 514; 364/492, 493

[56] References Cited

U.S. PATENT DOCUMENTS

| | | | |
|---|---|---|---|
| 3,818,481 | 6/1974 | Dorfman | 340/310 R |
| 3,911,415 | 10/1975 | Whyte | 340/310 A |
| 3,942,170 | 3/1976 | Whyte | 340/310 A |
| 3,967,264 | 6/1976 | Whyte | 340/310 A |
| 4,130,874 | 12/1978 | Pai | 364/514 |
| 4,190,800 | 2/1980 | Kelly, Jr. | 325/37 |
| 4,213,182 | 7/1980 | Eichelberger | 364/493 |
| 4,230,989 | 10/1980 | Buehrle | 375/4 |
| 4,264,960 | 4/1981 | Gurr | 364/492 |
| 4,302,750 | 11/1981 | Wadhwani | 340/807.02 |
| 4,311,964 | 1/1982 | Boykin | 329/104 |
| 4,352,992 | 10/1982 | Buennagel | 307/40 |
| 4,382,248 | 5/1983 | Pai | 340/ |

Primary Examiner—James J. Groody
Assistant Examiner—Michael F. Heim
Attorney, Agent, or Firm—William D. Lanyi

[57] ABSTRACT

A powerline carrier communications system includes a plurality of types of load management terminals, each of which has a unique address, and a combination field configuration and test terminal which can be plugged into the load management terminals. The combination terminal is coupled to the powerline through the connection to the load management terminal and generates a separate set of test commands for each type of load management terminal, which are transmitted over the powerline for execution by the connected load management terminal. Some types of load management terminals include an INITIALIZATION ENABLE line which, when activated by the connected combination terminal, commands the load management terminal to accept and store an address value received over the powerline as its new unique address.

10 Claims, 9 Drawing Figures

ELECTRIC UTILITY COMMUNICATION SYSTEM WITH FIELD INSTALLATION TERMINAL AND LOAD MANAGEMENT TERMINAL WITH REMOTELY ASSIGNABLE UNIQUE ADDRESS

BACKGROUND OF THE INVENTION

The invention relates generally to an electric utility communication system for remotely reading meters, controlling customer loads, and operating distribution equipment and, more particularly, to a system including a plurality of types of load management terminals, some with remotely programmable unique addresses, and a field installation terminal for testing and loading addresses into the load management terminals.

Electric utility companies are increasingly turning to communication systems in their continuing efforts to increase the reliability and control the cost of supplying electrical energy to their many residential and industrial customers. Such systems are used to remotely read customers' meters from a central location and to remotely control distribution equipment, as well as to effect remote load shedding during periods of peak energy usage.

In order to exclusively address a single customer location out of the multitude of such locations in an electric utility system, a communications terminal must be provided which responds to a unique address. Such a terminal is described and claimed in U.S Pat. No. 4,130,874 issued Dec. 19, 1978 to Stephen M. Pai and assigned to the assignee of this invention. The terminal described in this patent is an interactive two-way load management terminal which can efficiently perform a variety of meter reading and load control functions. However, the unique address is physically programmed into the terminal with wire jumpers or switches. It can be a time consuming process to open the load control terminal, select the proper settings, and reseal the terminal. The process is also prone to human programming errors. Another problem is that once the wire jumpers are installed, it is difficult to change the address.

Load management terminals such as described in the aforementioned patent are quite complex and can execute multiple load control and data acquisition functions as well as provide a large amount of status and error data. The manual testing of such devices thus becomes increasingly costly and complex, and can require large amounts of a skilled operator's time. Furthermore, load management terminals, when installed in the field, are electrically connected to the powerline and caution must be exercised in the testing.

It would therefore be desirable to provide a communication system which includes a load management terminal responsive to a unique address which can be more simply and reliably programmed. Furthermore, it is desirable to provide means for efficiently testing and assigning addresses to such terminals in the field.

SUMMARY OF THE INVENTION

In accordance with the present invention, electric utility communications apparatus is provided which includes a load management terminal connected to the power line and obtaining operating power therefrom. The terminal includes a receiver coupled to the powerline for receiving a carrier signal imposed thereon and means connected to the receiver for controlling loads in response to the carrier signals. The apparatus further includes a test terminal removably connected to the load management terminal and deriving operating power through the load management terminal. The test terminal comprises a test transmitter connected to the powerline for imposing carrier signals on the powerline, and means connected to the test transmitter for generating test commands for the load management terminal. The test terminal further includes means for modulating these commands onto the carrier signals generated by the test transmitter, whereby the commands are transmitted over the powerline and received by the load management terminal receiver to cause actuation of the load control apparatus and test the operation thereof.

A communication system is also provided wherein a load management terminal is connected to the powerline or other communications medium and includes a memory device for storing an address value to which the terminal will uniquely respond. The address value can be received by the terminal over the communications medium and stored in the memory device to be accepted as the assigned address of the load management terminal whenever an initialization enable line is actuated. A test terminal is also provided which is removably connected to the load management terminal and which can actuate the initialization enable line to permit the load management terminal to accept a value received over the communications medium as the uniquely assigned address for that load management terminal. Furthermore, the test terminal can include means for receiving an operator-entered address value and for transmitting this address value over the communications medium concurrently with the activation of the initialization enable line, whereby the operator-entered address value is accepted as the uniquely assigned address of that particular load management terminal.

BRIEF DESCRIPTION OF THE DRAWINGS

A more complete understanding of the present invention can be obtained by considering the following detailed description with reference to the accompanying drawings, in which.

DESCRIPTION OF THE PREFERRED EMBODIMENT

Description of Communication System

Figure 1:
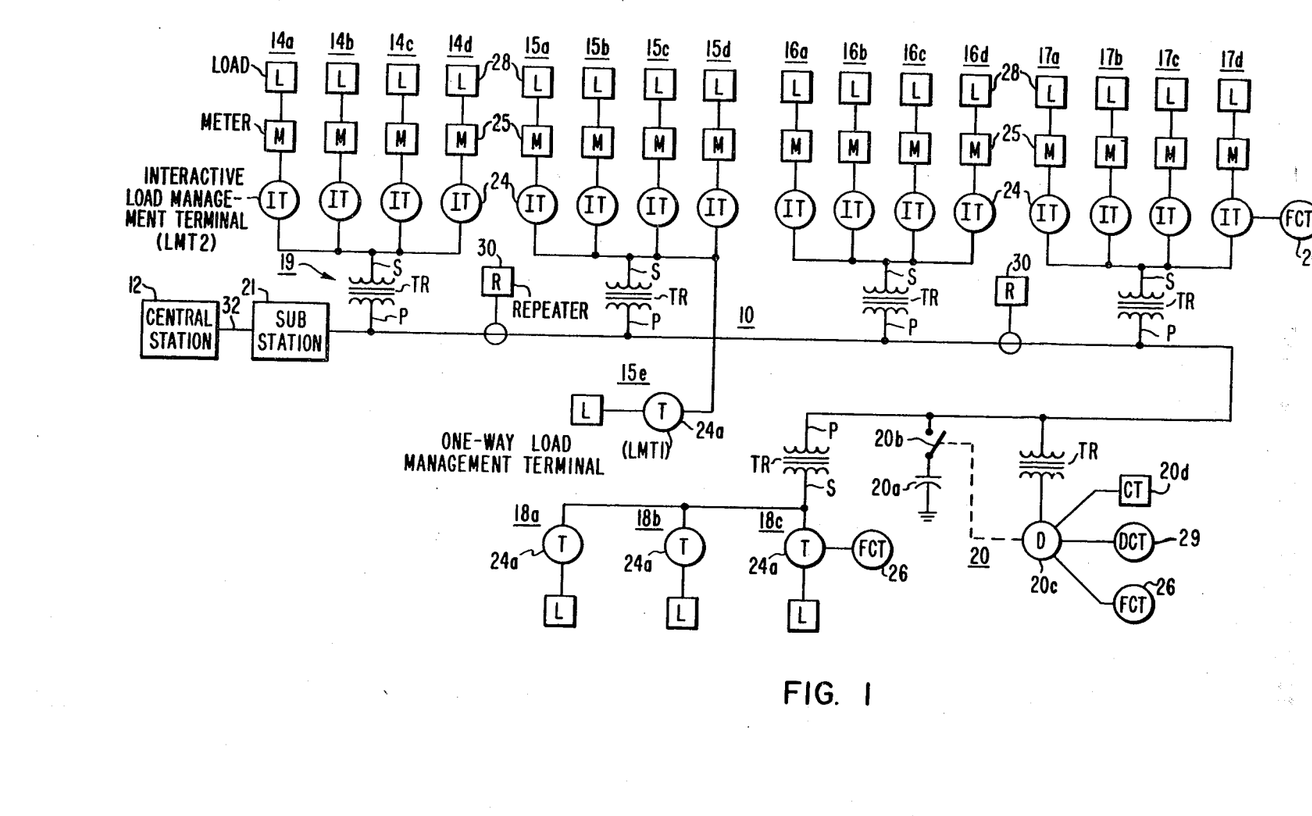
FIG. 1 is a block diagram of a powerline communication system including a plurality of types of load management terminals, and a field configuration terminal for testing and assigning addresses to the load management terminals.

Referring now to the drawings in which identical reference characters refer to corresponding elements, FIG. 1 shows a block diagram illustrating a powerline communication system 10 of an electric utility for communicating between a central station 12 and each of the utilities' customers. Typical customer locations are designated 14a, 14b, 14c, 14d, 15a, 15b, 15c, 15d, 15e, 16a, 16b, 16c, 16d, 17a, 17b, 17c, 17d, 18a, 18b, and 18c. An electric utility distribution equipment location 20 is also shown. Such a location could include a variety of equipment, however, in FIG. 1, a capacitor bank 20a is shown, controlled by an operating switch 20b.

The customer locations 14a–14d, 15a–15e, 16a–16d, 17a–17d, and 18a–18c are representative of subgroups or subgeographical areas containing hundreds or a few thousands of customer locations being supplied electric power from the secondary powerline conductors S of a powerline distribution system 19. The secondary conductors S are connected to large numbers of distribution transformers TR typically required to serve the previously-mentioned numbers of customer locations. The high voltage side of the distribution transformers TR are connected to a primary powerline conductor P served by substation 21 which is representative of one or more of such substations required to serve a large geographic area of customers, including all the customer locations shown in FIG. 1.

Each of the customer locations shown in FIG. 1 includes one of two types of load management terminals (LMT) 24 or 24a. The terminals 24 are interactive two-way communication terminals, indicated by IT, which provide two-way communication between the substation 21 and the various customer locations. The terminals 24a are one-way load management terminals, indicated by T, which provide load control functions in response to one-way communication from the substation 21 to the customer locations.

A distribution control terminal (DCT) 29 is provided at the equipment location 20, and is similar in function to the interactive LMTs 24 and the one-way LMTs 24a. The functions of each of the terminals 24, 24a, and 29 will be described in greater detail.

Each of the customer locations 14a–14d, 15a–15d, 16a–16d, and 17a–17d may also include metering apparatus 25 having a pulse initiator or encoding register for measuring and encoding the consumption of electrical energy supplied to customer loads 28. Communications carrier signals are transmitted between the LMTs 24 and the substation 21 through the distribution line conductors P and S which also have associated two-way repeaters 30 forming the communication system 10.

The one-way LMTs 24a also provide communications capability to their corresponding customer locations. However, they do not have the capability of communicating in a reverse direction from the customer location to the substation 21. Each of the LMTs 24a thus responds to load control commands transmitted from the substation 21 to connect and disconnect portions of their associated loads 28.

The DCT 29 includes two-way communication capability similar to that of the interactive LMTs 24. However, rather than connecting and disconnecting portions of customer loads, the DCT 29 controls various types of distribution equipment belonging to the electric utility. In the embodiment shown, the DCT 29 controls a switch 20b to connect and disconnect a capacitor bank 20a to the primary side of the powerline distribution system 1. In addition, the DCT 29 includes the capability to receive analog input data from the electric utility equipment and transmit this information back to the substation 21. In the embodiment shown in FIG. 1, a current transformer 20d is provided which provides current flow information to the DCT 29 for transmission back to the substation 21 and further communication to the central station 12.

One example of a communication system using the powerline as a communications medium is described and claimed in U.S. Pat. No. 3,911,415 issued Oct. 7, 1975 to Ian A. Whyte and assigned to the assignee of this invention. However, the present invention is not limited to such powerline communication systems as described hereinbelow or in the aforementioned patent.

Referring once more to FIG. 1, carrier communication signals are impressed on and received from the power line conductors P and S by transmitters and receivers (not shown) at the substation 21 and at each of the terminals 24, 24a and 29. The two-way repeaters 30 are coupled to the powerline conductors to amplify and re-transmit the carrier communication signals to amplify and re-transmit the carrier communication signals as they are transmitted over the powerline conductors. An example of one repeater arrangement suitable for use in the communication system 10 is described and claimed in U.S. Pat. No. 3,942,170 issued Mar. 2, 1976 to Whyte and U.S. Pat. No. 3,967,264 issued June 29, 1976 to Whyte et al., both assigned to the assignee of this invention and hereby incorporated into this application by reference. The communication link 32 between the central station 12 and substation 21 may be formed by a conventional telephone line. As has been described in the aforementioned patents, the communication carrier signals are modulated with binary coded messages containing command, interrogation, and status data to be communicated between the central station 12 and the locations of the terminals 24, 24 a and 29. These terminals are provided with a plurality of address formats and associated circuitry for response to the addresses as described in detail hereinafter.

Also shown in FIG. 1 are a plurality of field configuration terminals (FCT) 26. The FCTs 26 can be removably connected to the terminals 24, 24a, and 29 to perform a variety of testing functions and to assign unique addresses to the terminals 24 and 29 in a manner to be described hereinbelow. Each of the terminals 24, 24a and 29 is capable of receiving and being responsive to selective ones of a unique address (UA), a selected block address (SBA), or a universal block address (UBA). The UA identifies each discrete terminal so that each of the locations 14ar –14d, 15a–15e, 16a–16d, 17a–17d, 18a–18c, and 20 shown in FIG. 1 would have a separate and discrete binary coded unique address.

The SBA is the same for terminals at all of the locations of a selected geographic area. Accordingly, the terminals at locations 14a–14d would have a common SBA and the terminals at locations 15a–15e would have a different common SBA. The terminals at locations 16a–16d, 17a–17d, 18a–18c, and 20 have four additional and different SBA addresses. The UBA is common to all of the terminals of the locations of a large geographic area. Accordingly, all of the terminals 24, 24a, and 29 shown in FIG. 1 have the same UBA.

Description of LMT 24

Figure 2:
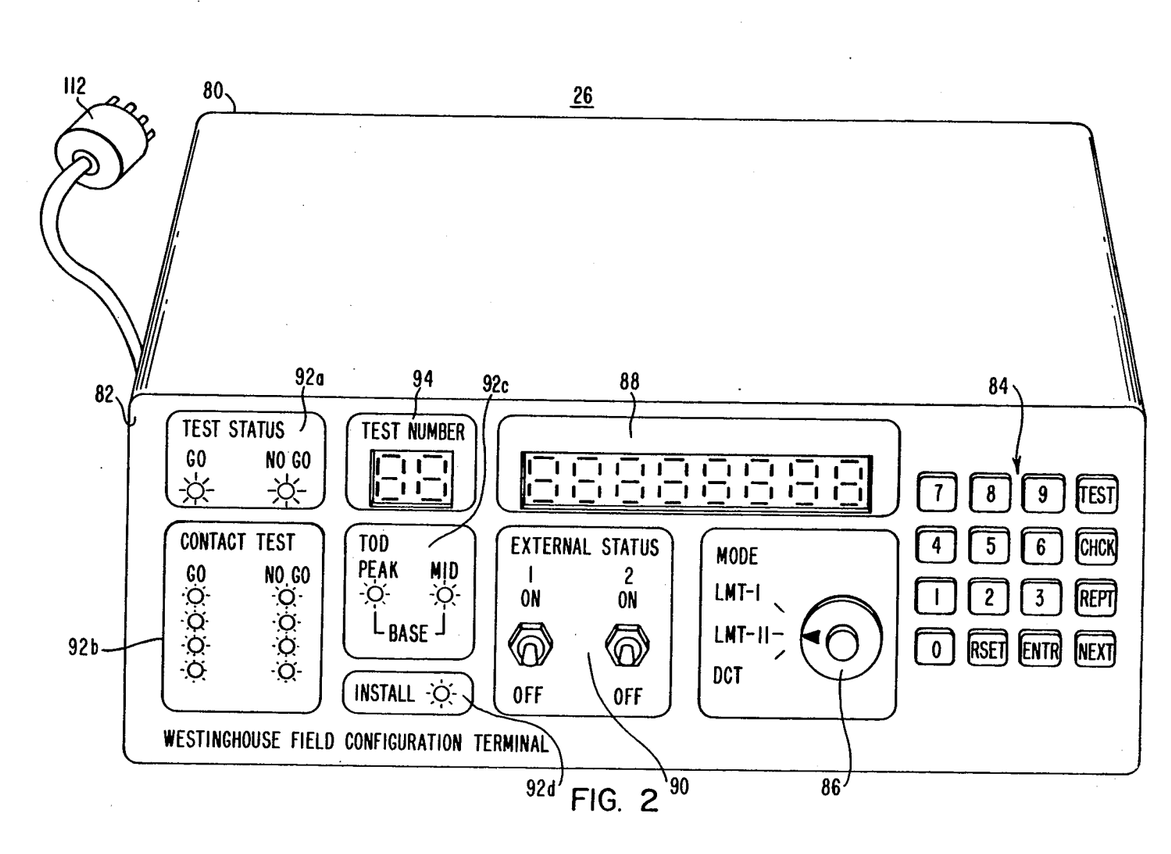
FIG. 2 is a perspective view of the field configuration terminal shown in FIG. 1.

In order to understand the construction of the interactive LMT 24 in greater detail, reference may be had to FIG. 2. The LMT 24 is similar in function to the LMT described and claimed in the aforementioned U.S. Pat. NO. 4,130,874. The format of the message words transmitted and received by the LMT 24 is identical to that described in the aforementioned U.S. Pat. No. 4,130,874; accordingly, the description of these message formats in the aforementioned U.S. Pat No. 4,130,874 is expressly incorporated herein by reference.

The major difference in function between the LMT 24 and the LMT described in U.S. Pat. No. 4,130,874 is that the unique address UA of the LMT of the patent is physically coded thereinto by wire jumper connections to its circuitry. The LMT 24 described herein as part of the present invention has the capability to accept as its unique address an address value down-loaded from the central station 12 by a message transmitted over the communications medium. By energization of an INITIALIZATION ENABLE line, to be described hereinbelow, the LMT 24 is commanded to accept a unique address so transmitted. Accordingly, unique addresses can be assigned to the LMTs 24 from the central station 12 of FIG. 1 in conjunction with the energization of the INITIALIZATION ENABLE line by an FCT 26. However, in most cases, the unique address will be assigned to the LMT 24 by an address value entered by an operator in the field into an FCT 26.

Figure 3:
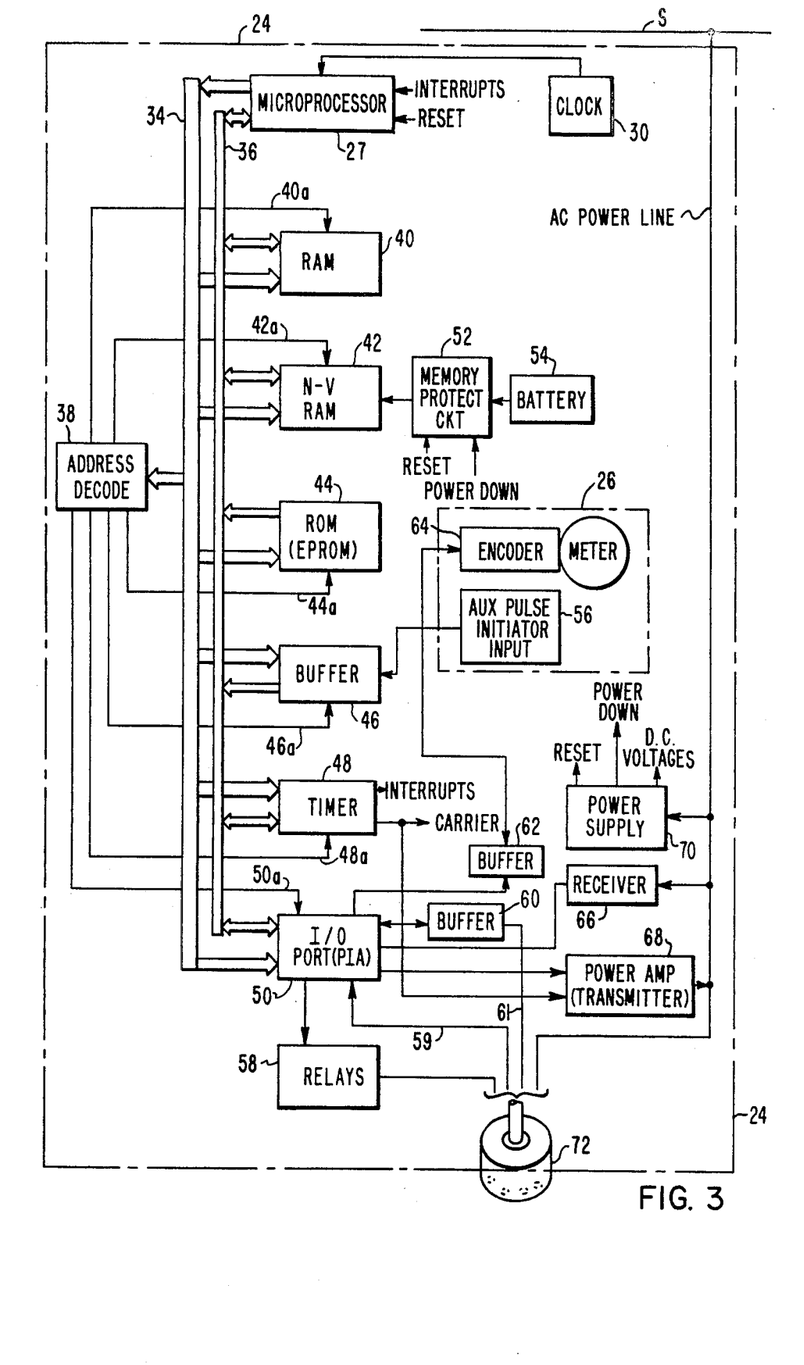
FIG. 3 is a block diagram of the interactive two way load management terminal shown in FIG. 1.

Structurally, the LMT 24 is quite different from that disclosed in the aforementioned U.S. Pat. No. 4,130,874 in that much of the circuitry has been rearranged, and the LMT functions consolidated and implemented through the use of a microprocessor. A block diagram of the LMT 24 is shown in detail in FIG. 3. The microprocessor 27 shown in FIG. 3 is a type SC44125T obtainable in commercial quantities from the Motorola Corporation. This microprocessor 27 is similar to the widely-known 6800-series of microprocessors and uses the 6800-series instruction set. However, this specific device, originally developed for applications in the automotive industry, can successfully operate over a much wider temperature range than the standard 6800-series microprocessor. In the disclosed embodiment, the microprocessor 27 is not an integrated microcomputer but rather an arithmetic logic unit utilizing a plurality of external circuit devices to perform the desired functions. However, as is readily apparent to one skilled in the art, other circuit configurations are equally suitable to perform the functions of the present invention.

A clock circuit 30 is provided to generate a stable series of 1 mHz clock pulses to the microprocessor 27. Other inputs to the microprocessor 27 include a reset line activated in response to conditions described hereinbelow and an interrupt line connected to a timer 48 to aid in performing demodulation functions of carrier signals received from the secondary powerline S. The microprocessor 27 is connected to an address bus 34 and to a data bus 36.

As is well known to those skilled in the art, the instruction set of the 6800-series of microprocessors does not include input and output instructions as such. Rather, such input and output functions are performed using commands similar to memory reads and writes. The associated input and output devices are mapped into the memory of the microprocessor 27 such that when an output is desired to a specific outboard device, a write command is directed to a specific memory address associated with that device. Accordingly, a plurality of input and output devices are connected to the microprocessor 27 through the address bus 34 and data bus 36. The input and output devices associated with the microprocessor 27 include a random access memory (RAM) 40, a non-volatile RAM 42, a read-only memory (ROM) 44, a buffer 46, the timer 48, and a programmable interface adapter (PIA) 50 which functions as an input/output port for the microprocessor 27. In order to properly access each of these devices, an address decode device 38 is provided.

When the microprocessor 27 desires to access one of the associated devices 40-50, the address associated with that device is placed on the address bus 34. The address decode device 38 receives this address and determines the associated device 40-50 which corresponds thereto. The address decode device 38 then energizes an appropriate ENABLE line 40a, 42a, 44a, 46a, 48a, or 50a to cause the proper device and only the proper device to either accept data from, or place data on, the data bus 36.

The RAM 40 is a type 6810 obtainable in commercial quantities from the Motorola Corporation. This device is used to store the changing data quantities produced by the microprocessor 27 as it executes the functions of the LMT 24. It is to be understood that more than one of such devices can, of course, be used, with appropriate memory mapping functions coordinated with the microprocessor 27.

The non-volatile RAM 42 is a type HM6561-9 obtainable in commercial quantities from the Harris Corporation. The data stored in this device will remain secure even though operating power to the device may be interupted. This function is provided by a memory protect circuit 52 supplied by a battery 54 and activated by reset and power down inputs which are in turn activated at appropriate times by a power supply 70.

The operating program instructions for the microprocessor 27 are stored in the ROM 44. This device is a type ID2716 electronically programmable read-only memory available in commercial quantities from the Intel Corporation. It is to be understood that certain embodiments of the present invention may require more than one such ID2716 device.

The buffer 46 is provided to accept data from a pulse initiator 56 of associated watthour metering apparatus 26. As is well known in the art, the pulse initiator 56 produces output pulses at a rate proportional to the consumption of electrical energy on the circuit being metered. These pulses are stored in the buffer 46 and are delivered to the data bus 36 upon command of the microprocessor 28.

The timer 48 is a type 6840 device obtainable in commercial quantities from the Motorola Corporation. This device periodically generates the interrupts necessary for the microprocessor to perform demodulation functions as described in U.S. Pat. No. 4,311,064 issued Jan. 19, 1982 to John R. Boykin and assigned to the assignee of this invention and which is expressly incorporated herein by reference. The timer also produces a train of pulses of a frequency of, for example 12.5 kHz to form the carrier signal utilized in transmitting messages from the LMT 24 over the powerline S.

The PIA 50 is a type MC6821CP device obtainable in commercial quantities from the Motorola Corporation. It functions as an input/output port for the microprocessor 28 and is connected to a variety of devices supplying input to or receiving output from the microprocessor 27. A plurality of relays 58 are connected to the PIA 50 to energize and deenergize associated loads 28 from the power line S. These relays are energized in response to commands generated by the microprocessor 27 which are in turn requested by signals received over the AC powerline S from the central station 12.

Also attached to the PIA 50 is a buffer 60 which stores the position of up to six two-wire contact closures. These closures would typically be used to monitor load control functions, provide a tamper indication for either the meter or the terminal electronics, or monitor a service disconnect function. Upon command from the microprocessor 28, the PIA 50 will request the buffer 60 to supply the state of the status contact closures to the PIA 50. This information will then be placed by the PIA onto the data bus for transmission to the microprocessor 27. The buffer 60 is a type LM3302 device obtainable in commercial quantities from the National Semiconductor Corporation.

The INITIALIZATION ENABLE input line is also connected through the PIA 50 to the microprocessor 27. When (and only when) this input line is activated by placing it at ground potential an address value received by the terminal 24 or 29 over the communications medium, such as the powerline S, will be stored by the microprocessor 27 in the NV RAM 42 and will become the assigned UNIQUE address for that terminal.

Although the most common procedure for assigning a UNIQUE address to the LMT is for a connected Field Configuration terminal to ground the INITIALIZATION ENABLE line and transmit an operator-entered address value to the LMT, the central station 12 may assign the address value by a message transmitted therefrom, if the INITIALIZATION ENABLE line of the LMT is grounded by a field worker.

An additional buffer 62 is connected to the PIA 50 to supply input from a register shaft encoder 64 which is also part of the watthour metering apparatus 26. The apparatus 26 may have a standard four- or five-dial output register which provides the meter reading to the customer. The encoder 64 determines the angular position of the shafts of this register and provides an electronic signal representative of the angular position of each shaft to the buffer 62. Upon command of the microprocessor 27, this information is transferred from the buffer 62 through the PIA 50 onto the data bus 36 and thence to the microprocessor 28.

In order to provide the interactive communications capability for the LMT 24, a receiver 66 and transmitter 68 are provided. The receiver 66 is directly coupled to the AC powerline and senses the presence of carrier signals thereon. Binary-coded message formats are carried by the phase-modulated carrier signal, which is bandpass filtered by the receiver 66 and supplied to the PIA 50. The 12.5 kHz signal is transferred by the PIA 50 onto the data bus 36 and supplied to the microprocessor 27 which provides a demodulation function to extract the binary coded messages therefrom. A more detailed description of the demodulation process is contained in U.S. Pat. No. 4,311,964.

As can be seen in FIG. 3, the transmitter 68 obtains an unmodulated carrier signal from the timer 48, and from the microprocessor 27 through the PIA 50 obtains the binary message which is desired to be transmitted to the central station 12. The binary message is then phase modulated onto the carrier and amplified by the transmitter 68 before being coupled to the AC powerline S, over which it is propagated to the substation 21.

A power supply 70 is connected to the AC power line S. The power supply 70 provides the necessary DC operating voltages for the devices of the LMT 24, and also provides appropriate power down and reset signals to the memory protect circuit 52 to ensure that the contents of the non-volatile RAM 42 remain secure during periods in which the supply of power through the AC line S is interrupted.

As can be seen in FIG. 3, the following connections are terminated at a socket 72: the output contacts of the relay 58, the INITIALIZATION ENABLE line 59, the status inputs 61, and the powerline S. The socket 72 thus forms an effective means for connection of the LMT 24 to associated independent devices outside of the LMT.

Description of DCT 29

Figure 4:
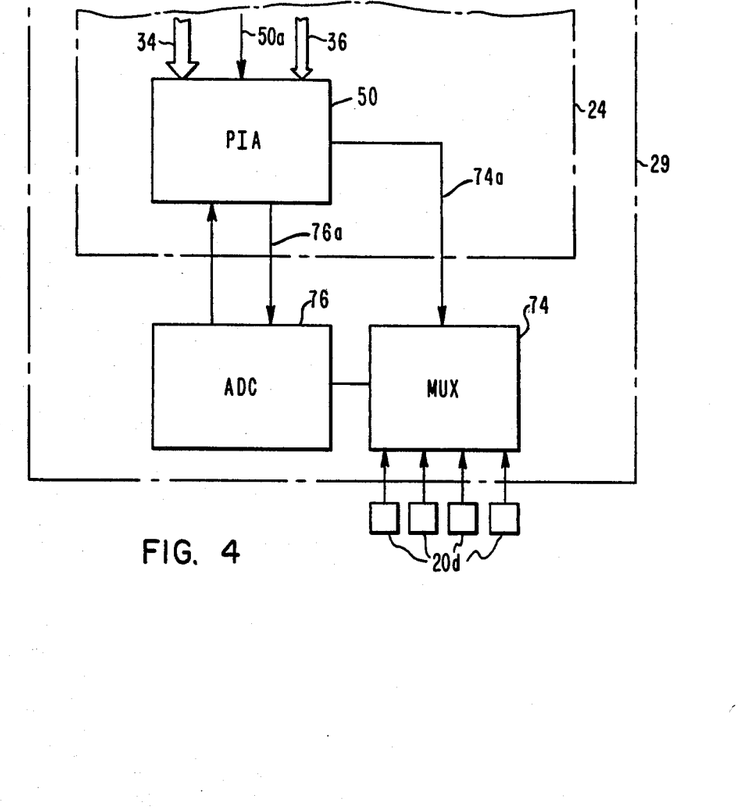
FIG. 4 is a block diagram of a distribution control terminal for remotely controlling distribution equipment from a central location, as shown in FIG. 1.

The distribution control terminal (DCT) 29 is very similar to the interactive LMT 24, with certain additional functions provided by components shown in FIG. 4. All other aspects of the DCT 29 are identical to that of the interactive LMT 24. As can be seen in FIG. 4, the inputs of a multiplexer 74 are connected to a plurality of transducers such as current transformer 20d. The output of the multiplexer 74 is connected to the input of an analog-to-digital converter (ADC) 76. The multiplexer 74 and ADC 76 may be type 4529B and 3711 devices, respectively, both of which are available from the National Semiconductor Corporation. The multiplexer 74 and ADC 76 are both connected to the PIA 50. The ENABLE inputs 74a and 76a of both the multiplexer 74 and analog-to-digital converter 76 are connected to the address decode device 38. Under command of the microprocessor 27, a select code corresponding to one of the transducers 20d is passed through the PIA 50 to the multiplexer 74. The output of the selected transducer 20d is then supplied through the multiplexer 74 to the input of the ADC 76. The ADC 76 then initiates a conversion of the analog quantity produced by the transducer 20d and supplies the digital value of this analog quantity through the PIA 50 to the data bus 36, where it is transmitted back to the microprocessor 27. All other functions of the distribution control terminal 29 are identical to that of the interactive load management terminal 24.

Description of FCT Operation

The FCT 26 is a portable microcomputer, used in support of the testing and installation of LMTs 24 and 24a and DCTs 29. As shown in FIG. 2 it is housed in a protective case 80, which also provides storage space for the interconnecting cables.

A coiled, multiconductor cable supplied with the FCT 26 is terminated in the plug 112 and is used to interconnect the FCT 26 directly to the LMT 24 or DCT 28. When a socket adapter is used, the FCT 26 can also be interconnected directly with socket-mounted LMTs 24a.

Power for the FCT is supplied through the connected LMT or DCT. A protective toggle switch-breaker 81, located on the left side of the FCT 26 is used to control input power. Although not visible in FIG. 2, the switch-breaker 81 is illustrated schematically in FIG. 5.

Except for the power switch-breaker 81, all operating controls are located on a front panel 82, which is recessed into the case 80. The tests performed by the FCT 26 are preprogrammed and must be performed in a sequence that is dictated by the resident software. Certain data, which is required by the program, is supplied by the operator through a keyboard 84. Test mode selection, identified by terminal type, is made by a three position MODE switch 86.

The key pad 84 consists of a totally enclosed, pressure-sensitive switch matrix that contains 16 keys. The keys are divided into two function groups. One group of six keys, located along the outer border of the key pad, is the CONTROL group and includes:

TEST—which initiates an FCT self-test that causes all of the numeric displays on the display and 11 of the 13 LED indicators to light for approximately 3.5 seconds. The TOD PEAK and MID indicators are not illuminated.

CHCK—which clears data entries that are displayed on the numeric display panel. CHCK does not clear data that has been entered via the ENTR key. The test sequence number is not affected by the CHCK Control. Data that has been entered by the ENTR key can be cleared only by using the RSET key.

REPT—which repeats the entire test transmission from the FCT to the terminal under test.

NEXT—which bypasses the test being conducted and proceeds to the next test in sequence, or, in the case of a program halt, causes the program to proceed to the next test.

ENTR—which enters data that is visually displayed on the numeric display panel into the test program.

RSET—which resets the FCT. It re-initializes the instrument and begins the test sequence again.

The other group contains 10 numeric keys (0-9) that are used to input numeric data into the digital display panel 88.

The MODE switch 86 is a three position rotary switch that is used to interface the FCT 26 and one of the three types of terminal equipment. These are specified as LMT-1 (corresponding to one-way LMT 24a), LMT-2; (corresponding to interactive LMT 24); or DCT 29. An improper match of the terminal under test and the position of the MODE switch will be detected by the test program.

EXTERNAL STATUS 90 consists of two toggle switches that are marked EXTERNAL STATUS 1 and 2. They control status flags within a connected DCT 29 to establish the present state of the DCT relay contacts.

The Numeric Display 88 is an eight digit display panel that visually indicates numeric entries made by key pad operation. Numbers called for in test procedures are entered conventionally (reading from left to right) and progress serially across the display panel from right to left. Overflow is continuous at the left-most digit. Error signals are displayed if a test is unsuccessful.

TEST STATUS indicators 92a are a pair of LEDs that visually indicate that the unit under test has passed or failed any one of the tests in the sequence. A green GO LED indicates that the test was completed successfully. A red NO-GO indicates failure. The GO LED stays lit for one second during the test sequence if the test is passed. If the connected LMT fails the test, the red NO-GO LED remains lit until the test sequence is reset. While the NO-GO LED remains lit, an error signal appears in the display panel.

CONTACT TEST indicators 92b are paired red and green LEDs labeled GO and NO-GO. Four such pairs are arranged vertically at the left-most side of the control panel. Each pair corresponds to a relay in the terminal under test. Contact status for latched relays is indicated by the uppermost pair.

TOD [PEAK, MID] 92c indicates the status, at the time the test is made, of the time-of-day rate schedule that is configured in a connected LMT 24. These indicators have no meaning in the LMT-1 test mode for LMTs 24a.

INSTALL is a single red LED 92d that is lit only during the installation procedure. It verifies visually that the FCT is operating in the INSTALL mode and will transmit an operator-supplied unique address value to the connected LMT, while activating the INITIALIZATION ENABLE line, to cause that address value to become the assigned UNIQUE address for the connected LMT.

TEST NUMBER is a two-digit display panel 94 which displays the number of the test currently being conducted.

General Test Information

After inserting the plug 112 into the socket 72 of the terminal under test, the power switch 81 is turned on and the TEST key pressed. The FCT control panel 82 is checked before a test routine is started to make certain all indicators are functioning properly. All of the digits on the numeric display 88 and the TEST NUMBER panels 94 will display 8s. All of the LEDs, except TOD (PEAK and MID), will be lighted. The numeric displays and the LEDs will remain lighted for 3.5 seconds.

The numeric display panel is cleared by entering all "zero" digits or by using the CHCK control key. The CHCK key is preferred.

Tests numbered 2 through 5 require that data be input through the key pad. All tests numbered greater than 10 are performed in a predetermined sequence by the FCT without operator intervention.

To be considered valid, all numeric key pad entries must be accompanied by an appropriate single-digit checksum which is the arithmetic total of all of the digits that are input. The right-most digit of a multi-digit checksum is to be used.

As an example, consider the input of UNIQUE address 123456. The arithmetic total of the digits is 21 (1+2+3+4+5+6) and represents the checksum. The right-most digit of the checksum is 1. Thus, the UNIQUE address 123456 is input, followed by 1. The entire arithmetic entry is made before the ENTR key is pressed.

Data displayed on the panel 88 is entered into the test program by the ENTR key. So long as the data remains displayed, it can be altered or deleted by using the CHCK control key without affecting the test program. If the data-checksum combination that has been entered is valid, the green GO LED in TEST STATUS will light momentarily and the TEST NUMBER at display 94 will increment. Should the data-checksum combination be invalid, the red NO GO LED will remain lighted in TEST STATUS 92a and the data entry sequence will halt.

After data has been entered into the program, invalid entries can be cleared only by the RSET control, which returns the test sequence to 01. This procedure clears all previously entered data and requires that all necessary data be reentered.

Test sequence 05 signals the end of the data entry procedure. The program halts at this step and remains halted until the NEXT key is pressed. Once initiated by the NEXT key, the test sequence cannot be halted by the FCT operator. The sequence will continue to a satisfactory conclusion (GO) or will halt due to a test failure, displaying a NO-GO. In the event of a test failure, and thus a program halt, the sequence can be continued by pressing the NEXT key. At the conclusion of a test sequence, the sequence may be repeated without reentering the data by pressing the REPT key.

Only one test can be performed on a one-way LMT 24a. It verifies the operation of timed relays. Indirectly, this test also verifies the coding of the selected Block Address since a miscoded address will consistently produce a failed test (NO-GO) indication on all relay positions that were specified in the FCT Control Number.

There are three test sequences which can be performed on the interactive terminals 24 and 29: INSTALLATION, TEST, and READ AND TEST. The INSTALLATION test sequence is used to initialize all interactive terminals 24 and 29 by downloading the terminal's UNIQUE address during the test procedure. The other two test sequences are used to operationally test interactive terminals after they have been initialized. The sequences are identical except for the manner in which the UNIQUE address is checked. The TEST sequence requires that a UNIQUE address be entered into the FCT by the operator. This address is then compared with the address recovered from the interactive terminal by an interruption command. The test is useful for checking a suspected bad address.

The READ AND TEST sequence does not require the operator to input the UNIQUE address. The UNIQUE address that is resident in the terminal is read from the terminal during the sequence and this address is used thereafter when required by the sequence. During the TEST and READ and TEST sequences, the terminal's ability to respond to Selected Block Addressing is inhibited. This is reset to the pretest state by the last test procedure in either sequence.

The time required to perform each test in a sequence varies from test to test. During test intervals of longer than 3 seconds duration, both TEST STATUS LEDs will blink once per second to indicate that the sequence is being performed.

Individual Tests

Certain tests that are to be made prior to the various automatic sequences are common to all terminals and require that data be entered into the test program by the FCT operator, using the key pad. Other tests are specific to each terminal type and are conducted automatically by the resident FCT test program after certain data are specified.

Test 01 is performed automatically when the FCT is interconnected with the terminal to be tested and the FCT is turned ON. This test is also performed each time that the RSET key is pressed.

The test determines whether the terminal under test and the MODE switch setting agree. If they agree, 02 appears in the TEST NUMBER window 94. If they are not in agreement, 01 appears, which requires that the MODE switch be rotated to the appropriate terminal label. The number 02 should now appear in the window. The ENTR key does not have to be pressed.

TEST 02 requires that the numeric value representing the terminal address be entered. Eight zeros will appear in the numeric display. The value is keyed (up to seven digits allowed) followed by the checksum digit, and the ENTR key pressed. If a valid data-checksum combination has been entered, three zeros will appear in the display window 88 and 03 will be displayed in the TEST NUMBER 94. If the numeric combination is not valid, the NO-GO TEST STATUS LED 92a will light.

TEST 03 requires the entry of a three digit code identifying the number and type of control relays contained in the terminal to be tested. This code is called the FCT Control Number and consists of the following:

First digit—0-4 The number of relays to be tested.
Second digit—0 The LMT contains no latched relays.
    1 Signifies that the condition of the latched relay is to be left in the same state as it was found before the test.
    2 Indicates that the latch relay is to be left open after testing.
    3 Indicates that the latched relay is to be left closed after testing.
Third digit 0-7 Checksum.

ENTR is pressed after keying the appropriate data. Two zeros appear in the numeric display 88 if a valid data-checksum combination is used; the test number also advances.

TEST 04 requires that the FCT operator select one of the three test types for LMT 24 or DCT 29. This information is not required for LMT 24a and the test program skips this procedure.

Code 11—INSTALLATION test. The FCT downloads a UNIQUE address to the terminal.
Code 33—TEST. The FCT tests for a match of the UNIQUE address entered into the FCT and the UNIQUE address residing in the terminal.
Code 77—READ AND TEST. The FCT reads the UNIQUE address residing in the terminal and displays it. The program halts after the reading is made.

If the four preceding steps have been accomplished properly, the test number increments to 05 after the ENTR key is pressed and the numeric data on the display panel is cleared. The panel remains blank.

Failure to perform any of the steps correctly will cause the data to remain on the numeric display 88 and the TEST NUMBER 04 will not increment.

TEST 05 is the beginning of the automatic test sequence and the data entry sequence is halted at this step. The appropriate test sequence will begin after the NEXT key is depressed.

Performance of the specific tests is type-dependent, with each sequence being programmed for the terminal type specified by the test MODE switch 86. The programmed sequence, which begins when the NEXT key is pressed, also depends upon the test type selected by the operator.

Satisfactory completion of each test is visually demonstrated by the TEST STATUS GO LED 92a, which lights for one second, and by the advance of the number in the TEST NUMBER window 94 to the next test in the sequence. This number remains lighted while the test is being performed.

Failure to pass a test is visually shown by the TEST STATUS NO-GO LED 92a, which remains lighted. The sequence halts; the current test number remains in the TEST NUMBER window 94; and an error code appears in the numeric display 88.

Pressing the NEXT key under these conditions causes the sequence to continue to the next programmed test.

Error Code Directory

When the FCT fails to perform a certain test properly, an error code is displayed that indicates the malfunction encountered during the test sequence. The following error codes may be displayed:

0 No transmission from the FCT. The following error codes do not apply to the one-way terminals 24a.
1. No reception from an interactive terminal.

2. No second word in the message received by the FCT.
3. Bad BCH code on message received by the FCT.
4. Any data error in the received message, including the UNIQUE address.
5. Presence of a latched relay on the terminal does not agree with the FCT Control Number entered.
6. The terminal type-identifier encoded within the terminal memory does not agree with the type set by the MODE switch.

TEST PROCEDURE FOR ONE-WAY LMTs 24a

1. Place both EXTERNAL STATUS switches 90 of the FCT in the OFF position.
2. Insert the plug 112 into socket 72 on the terminal adapter. The FCT is now powered from the connected terminal. Rotate the MODE switch 86 to the LMT-1 position before turning on the FCT. Turn on the FCT power-breaker switch 81.
3. Check the FCT indicators on front panel 82 by pressing the TEST key.
4. Check that 02 appears in the TEST NUMBER window 94. Test 01 has tested the proper match of the MODE switch position and the terminal under test. If 01 appears in the window 94, the TEST STATUS LED 92a will display NO-GO, which indicates an FCT-terminal mismatch. Rotate the MODE switch 86 to the appropriate terminal type and observe the number in the TEST NUMBER window 94 for an advance to 02.
5. Key in the LMT 24a Selected Block Address (SBA). This number ranges from 0 to 59. Key in the checksum digit. Press the ENTR KEY. If the SBA address-checksum combination is valid, the TEST NUMBER will advance to 03 and three "zero" digits will light on the display panel 88. If the address-checksum combination is invalid, the TEST NUMBER will not advance. Press CHCK to clear the invalid combination and try again.
6. Key in the number of relays in the terminal that are to be tested, followed by the appropriate checksum (FCT control number). Press the ENTR key. The test sequence will advance to 05, bypassing 04. The numeric display will blank.
7. Press the NEXT key. The test sequence starts by performing test 35, which tests timed relays.
8. The FCT 26 transmits the chosen SBA address and SHED LOAD Action Message over the powerline to the LMT 24a. Failure to transmit will result in Error Code 0 being displayed in window 88. Approximately 50 seconds will be required to complete the test.
9. Midway through the test the FCT will transmit the SBA address and a RESTORE LOAD Action Message. The display of Error Code 0 will signify an FCT failure (no transmission). Press REPT to try the test again.
10. During the time interval that the FCT performs test 35, the TEST STATUS LEDs 92a will blink simultaneously once per second to indicate that the test is on-going.
11. Test 35 tests the high-current relay of LMT 24a by transmitting a SHED LOAD command, followed by a RESTORE LOAD command. The relay contact closure is checked directly.
12. Successful completion of the test is indicated when TEST STATUS GO LED 92a remains lit. The A level (bottom of the group) CONTACT STATUS GO LED 92b will also remain lit.
13. Failure to pass the test causes the TEST STATUS NO-GO LED 92a and the CONTACT STATUS (A level) NO-GO LED 92b to light simultaneously.
14. If an invalid FCT Control Number is entered, the TEST STATUS 92a will display NO-GO at the completion of the test, but the CONTACT STATUS 92b will display GO for the relays successfully tested.

TESTING THE INTERACTIVE LMT 24

The FCT can perform three test sequences on the LMT 24. These are:

| | | |
|---|---|---|
| INSTALLATION | Code | 11 |
| TEST | Code | 33 |
| READ and TEST | Code | 77 |

Test codes 33 and 77 are identical except for the identification of the unique address.

A description of each of the tests performed in the test sequence is contained in Table 1. These are listed by test number and the sequence in which they are performed. Error codes that may be displayed for each test are also listed.

TABLE 1

| DESCRIPTION OF TEST | TEST NUMBER | TEST SEQUENCE | POSSIBLE ERROR CODES |
|---|---|---|---|
| Download UNIQUE address | 15 | 11 | 0 |
| Read and verify UNIQUE address | 20 | 11/33/77 | 0,1,2,3,4 |
| Read hardware configuration and verify whether an encoding register 164 or pulse initiator 56 is used and whether a latched relay is present | 25 | 11/33/77 | 0,1,3,5,6 |
| Read the status of the SBA address response | 26 | 33/77 | 0,1,3 |
| Inhibit SBA address response | 27 | 33/77 | 0 |
| Reset all error flags, inhibit time sync flag, reset battery log to zero | 30 | 11 | 0 |
| Test timed relays | 35 | 11/33/77 | 0 |
| Test latched relay, if present, and restore in accordance with FCT Control Number | 40 | 11/33/77 | 0 |
| Read and display the reading of the encoding register 164 | 45 | 11/33/77 | 0,1,3 |
| Read and display reading of the pulse initiator 56 | /or 46 | 11/33/77 | 0,1,3 |

TABLE 1-continued

| DESCRIPTION OF TEST | TEST NUMBER | TEST SEQUENCE | POSSIBLE ERROR CODES |
|---|---|---|---|
| Restore SBA address response to the pretest state | 50 | 33/77 | 0 |

PERFORMING THE TESTS ON LMT 24

1. Insert the plug 112 into socket 72.
2. Rotate the MODE switch 86 to the LMT-2 position.
3. Turn on the FCT power-breaker switch.
4. Check the FCT indicators by pressing the TEST key.
5. Check that 02 appears in the TEST NUMBER window. Test 01 verifies a proper match of the MODE switch position and the terminal under test. This is a hardware test. If 01 appears in the window, the TEST STATUS LED 92a will display NO-GO, which indicates an FCT-terminal mismatch. Rotate the MODE switch 86 to the appropriate terminal type and observe the TEST NUMBER window 94 for an advance to 02.
6. Select the appropriate code for the test that is to be performed on the LMT 24 in accordance with the following schedule.

| CODE | TEST TYPE |
|---|---|
| 11 | INSTALLATION |
| 33 | TEST |
| 77 | READ AND TEST |

If code 11 or 33 is to be chosen, key in the UNIQUE address, then the checksum. Press the ENTR key. If the address-checksum combination is valid, the TEST NUMBER will advance to 03 and three "zero" digits will appear on the display panel 88. If the address-checksum combination is invalid, the TEST NUMBER will not advance. Press CHCK to clear the invalid combination and try again.

The UNIQUE address is not keyed in if test sequence 77 is to be used. Reference is made to (10) below then to (7).

7. Key in the number of relays in the LMT-24 that are to be tested followed by the appropriate checksum (FCT Control Number). Press the ENTR key. The test sequence will advance to 04.
8. If the INITIALIZATION sequence, code 11, has been chosen, the following sequence of tests will be performed: 15,20,25,30,35,46-END.
9. If the TEST sequence, code 33, has been chosen, the following sequence of test will be performed: 20,25,26,27,35,46—HALT—press NEXT—50, end of test sequence.

Sequence code 33 requires that the UNIQUE address-checksum combination be input using the key pad. When the sequence starts, the FCT will check the UNIQUE address residing in the LMT 24 and compare it with the one displayed on the FCT panel 88. IF the addresses agree, the sequence continues without interruption.

If they do not agree, the sequence will halt and Error Code 1 will be displayed. Use of the RSET key clears the FCT and reenter all of the data required in steps 02 through 04.

10. If the READ AND TEST sequence, code 77, has been chosen, the following sequence of tests is performed: 20—HALT—press NEXT—25,26,27,35,46—HALT—press NEXT—50—end of test sequence.

Sequence code 77 does not require the input of a UNIQUE address. The FCT interrogates the LMT 24 and reads the UNIQUE address residing in the terminal. This data will remain displayed on the numeric display panel 88 and the test sequence will halt. The FCT operator then compares this address with the one that has been operationally assigned to the LMT 24 being tested.

If the operator wishes to repeat this test, he presses REPT. This test may be repeated as many times as is required before continuing with the sequence. The test sequence may be continued beyond the program halt by pressing the NEXT key.

11. Test sequences 33 and 77 will halt automatically at test 46. The data retrieved from the pulse initiator 56 will remain displayed while it is being observed by the FCT operator.
12. The test sequence must be terminated by pressing NEXT. Test 50 will be performed and the sequence will be concluded.

STRUCTURE OF FCT

Figure 5:
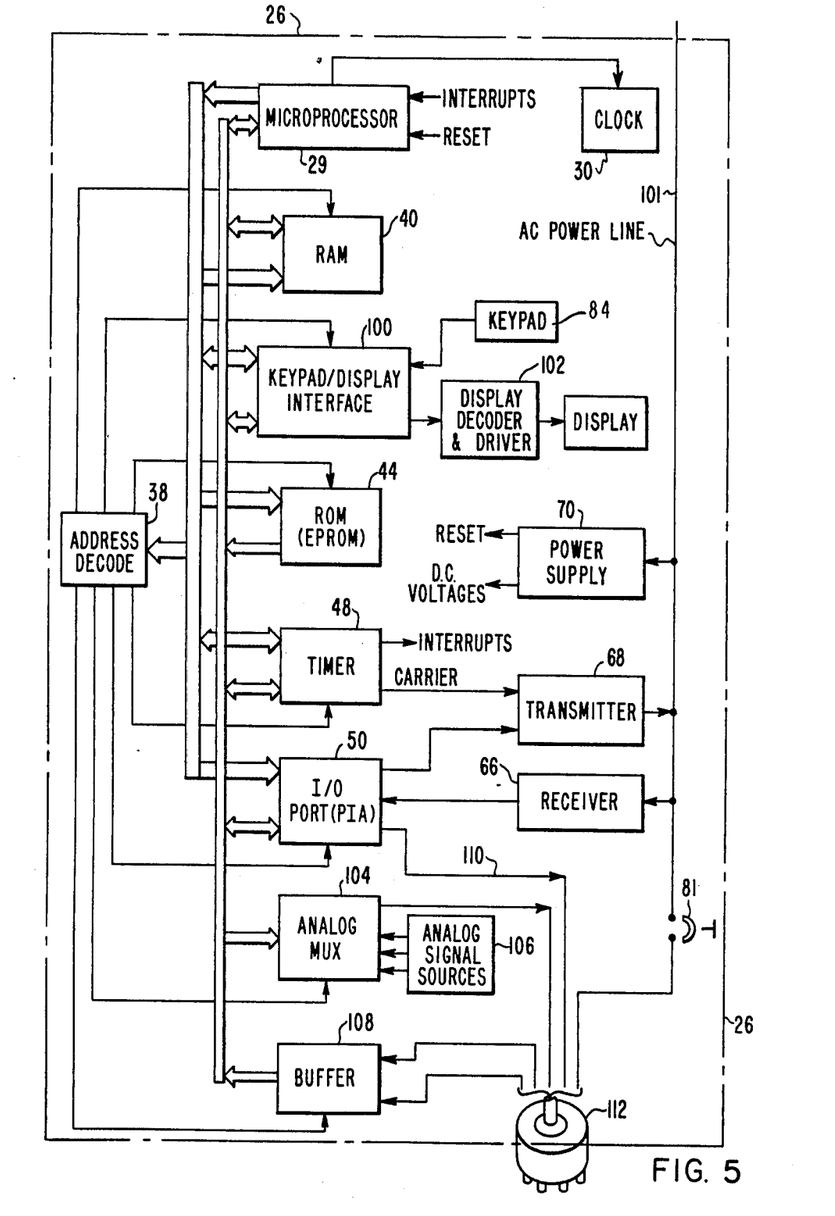
FIG. 5 is a block diagram of the field configuration terminal shown in FIGS. 1 and 4.

A block diagram of the field configuration terminal 26 is shown in FIG. 5. As can be seen therein, the FCT 26 is very similar to the interactive LMT 24 and DCT 29 and includes many components in common therewith.

The FCT 26 includes a key pad/display interface device 100 which may be a type ID8279 device obtainable in commercial quantities from the Intel Corporation. The key pad/display interface device 100 is connected to the address bus 34 and data bus 36. Its input is connected to the key pad 84 and its output to display decoder and driver circuitry 102 which is connected to the numeric displays and LED indicators. The display decoder and driver circuitry provides the function of converting the binary data supplied by the keyboard/display interface 100 into seven segment code for the numeric display device and amplifying this seven segment output along with corresponding activation outputs for the LED indicators 92a-92d to levels sufficient to drive the numeric display devices 88 and 94 and LED indicators 92a-92d to full brilliance.

An analog multiplexer 104 is connected to the data bus 36 and address decode device 38. The multiplexer 104, under command of the microprocessor 27, selects one of a plurality of analog signal sources 106, each of which provides a different known level of analog signal and supplies the selected source as an analog test output signal.

A buffer 108 is also connected to the data bus 36 and to the address decode device 38. The buffer 108 stores contact closure information from contacts of relays 58 from an associated LMT 24 or, 24a, or DCT 29, and the status switches 90 on the panel of the FCT 26, and provides such information onto the data bus when so commanded by the microprocessor 27.

The PIA 50 of the FCT 26 also includes an INITIALIZATION ENABLE output 110 which is connected to the INITIALIZATION ENABLE input line of an associated LMT 24 or DCT 29, such that when the FCT places the INITIALIZATION ENABLE at ground potential, the associated LMT or DCT will accept an incoming address value as its assigned UNIQUE address.

As can be seen, the AC powerline 101, INITIALIZATION ENABLE output 110, output of the analog multiplexer 104, and relay contact inputs to the buffer 108 are all terminated in the connector plug 112. The plug 112 is compatible with output socket 72 of associated LMTs 24 and 24a, and DCT 29. When the plug 112 is inserted in the socket 72, AC power is supplied from the AC powerline S through the associated terminal 24, 24a, or 29 to the line 101 of the FCT 26. The INITIALIZATION ENABLE output 110 is similarly connected to the INITIALIZATION ENABLE input 59 of a terminal 24 or 29. Contacts of the relay 58 of the associated terminal 24, 24a or 28 are connected to the buffer 108 and the analog test output 110 is connected to the multiplexer 74 of an associated DCT 29.

DESCRIPTION OF OPERATION OF FCT

Figure 6A:
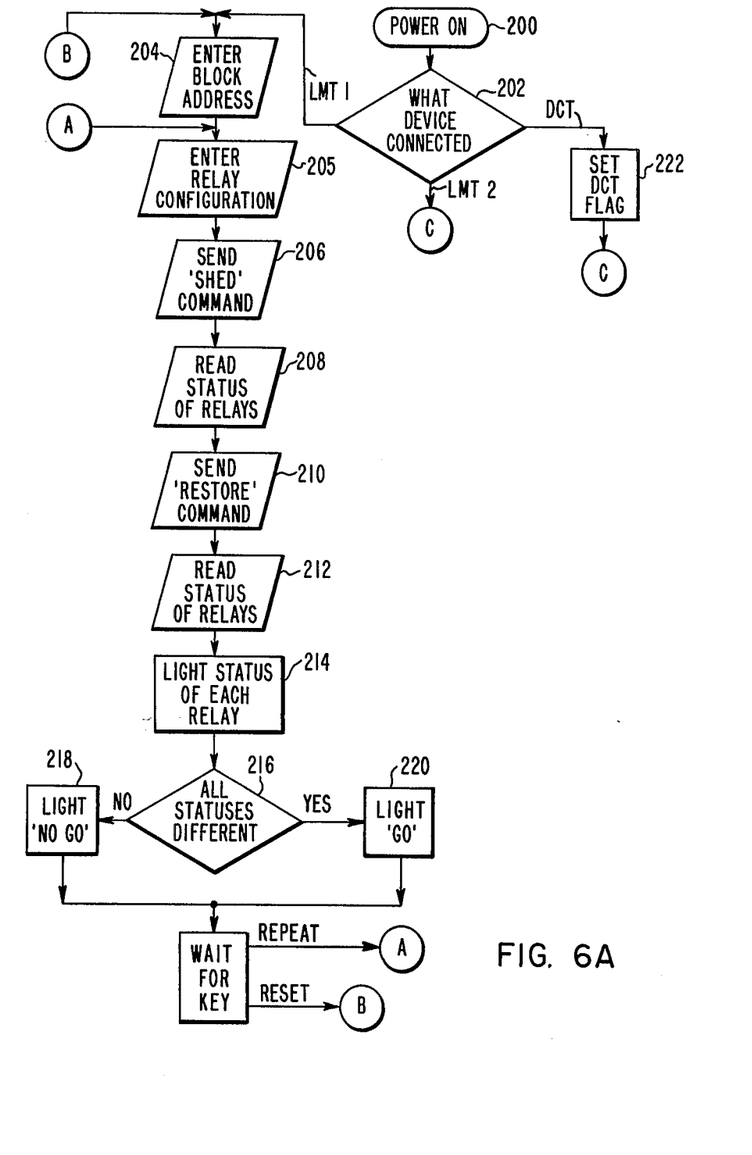
FIGS. 6A, 6B, 6C, and 6D are flow charts describing the operation of the field configuration terminals shown in FIGS. 1, 3, and 5.

A flow chart of the overall operation of the FCT 26 is shown beginning in FIG. 6A. Instructions sufficient to perform the functions shown in the flow chart are stored in the ROM 44 of FIG. 5.

As soon as power is supplied to the FCT 26, the microprocessor 29 determines the type of device in which the plug 112 is inserted. This information is obtained by reading shorting pins within the socket 72, which are different for each type of device. If a one-way LMT 24a is connected to the FCT, program flow proceeds through point B to operations calling for the entry of a Selected Block Address at 204 and of the relay configuration at 205. This is accomplished using the key pad 84 as described hereinbefore. Next a SHED LOAD command is generated in block 206 and transmitted as a carrier signal over the powerline. The connected LMT 24a then deenergizes the relays. Since connections to the relay contacts pass through the socket 72 and plug 112, the status of the relay contacts is available to the buffer 108. At block 208, the microprocessor reads the status of the relays and then generates a RESTORE LOAD command which is transmitted as a carrier signal to the connected terminal 24a to cause the relays to once again close their associated contacts. At block 212 the status of the relay contacts is again read. The performance of the relays is then presented on the panel of the FCT by indicators 92b at block 214.

At block 216 a test is made to determine if the status of the relays as determined by blocks 208 and 212 changed. If not, program flow passes to block 218 wherein the NO-GO light 92a is illuminated. If the relay status is different, the GO indicator 92a is illuminated at block 220. The program NEXT goes into a WAIT state looking for further input from the keyboard 84. If the REPEAT is pressed, program flow transfer to block 206 wherein the relay test is repeated for the same block address. If the RESET key is pressed, the program calls for a new operator entered value of selected block address at block 204.

Figure 6B:
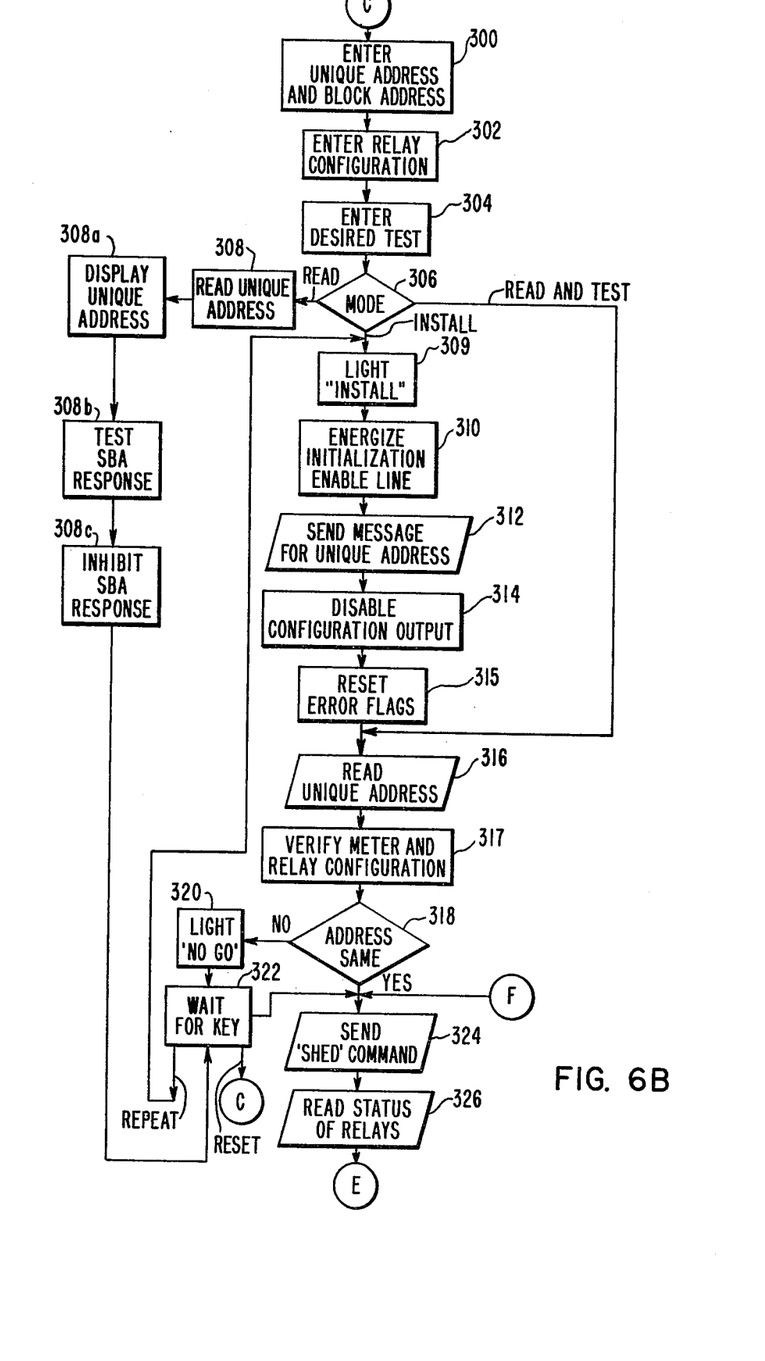

If it is determined at block 202 that an interactive LMT 24 is connected to the FCT, program flow passes to block 300 in FIG. 6B, where operator entered values of UNIQUE address and Selected Block Addresses are called for. Next, the FCT calls for an operator entered value indicating the number of relays to be tested followed by a request for the type of test desired. As was explained before, this can include an installation, wherein a unique address is to be assigned to the connected terminal, a configuration check to see if the unique address of the connected terminal is the same as an address entered into the FCT by the operator, or a test to determine which unique address is currently assigned to the connected terminal. At block 306, the program determines which of the test modes is desired and branches accordingly. If a Code 77 (READ AND TEST) has been entered, a program at block 308 generates commands to cause the connected terminal to transmit the UNIQUE address programmed thereinto. The FCT then displays the UNIQUE address received from the terminal to determine if the connected terminal responds correctly to an SBA command, and inhibits the terminal SBA response. When a NEXT key is pressed, program control then transfers to block 324.

Figures 6C, 6D:
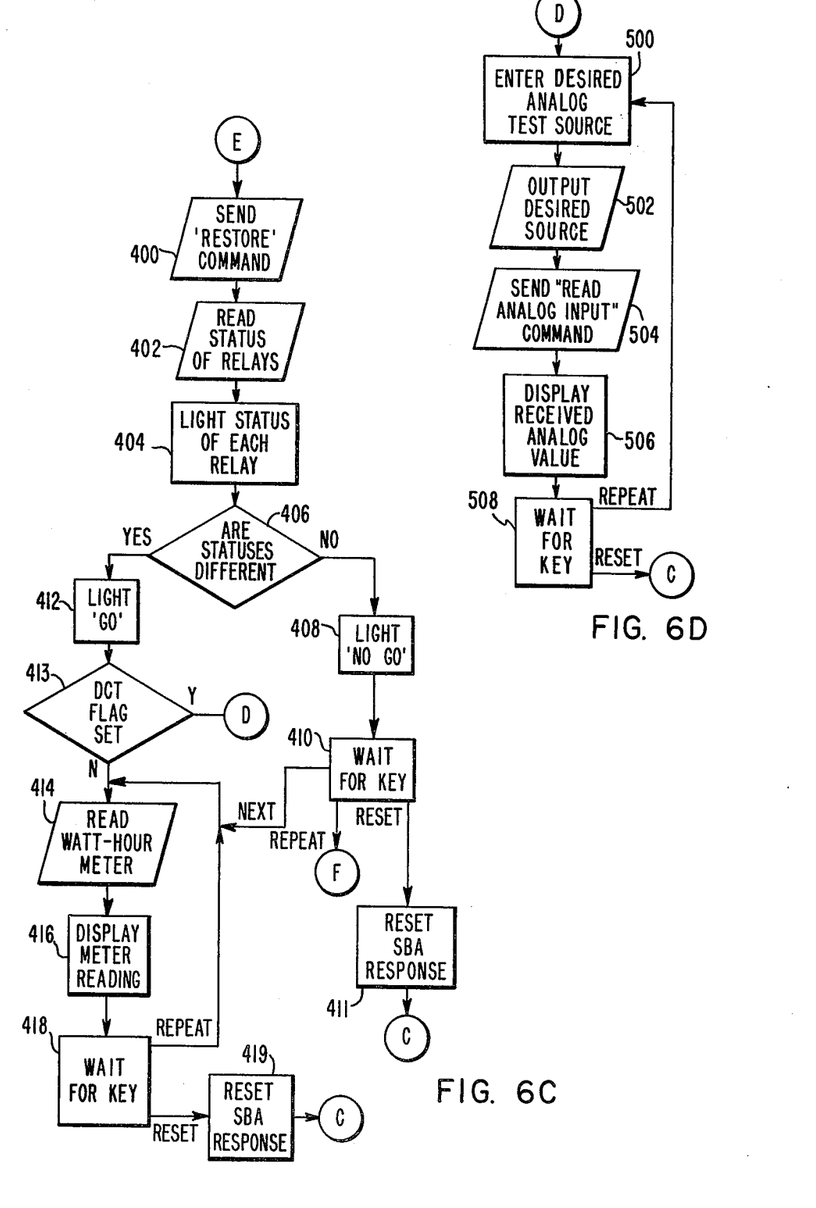

If a Code 33 TEST has been requested, program control transfers to block 316 of FIG. 6B. If a Code 11 (INSTALLATION) has been requested, the INSTALL indicator. 92d is lighted and the INSTALLATION ENABLE line is activated by placing it at ground potential. This causes the connected terminal to look for a message containing a UNIQUE address value. The connected terminal will then take a value so transmitted and accept that value as the UNIQUE address assigned to that terminal. At block 312, the FCT takes the operator-entered address value and sends a message containing that value over the powerline, where it is accepted by the connected LMT. In block 314, the INITIALIZATION ENABLE terminal is deactivated by the FCT and a message transmitted to the connected LMT to retransmit the value of UNIQUE address now stored in nonvolatile RAM thereof. In block 318, the FCT determines if the address received from the connected LMT is the same as the address value entered by the operator at block 300 and also verifies the meter and relay configuration. If the received address is not the same, program control advances to block 320 wherein the NO-GO LED 92a is energized. The program then advances to a wait state at block 322. If the UNIQUE address received from the connected terminal is the same as the operator-entered value, the FCT next generates a SHED LOAD command in block 324 and transmits this command over the powerline to the connected terminal. The status of the relays of the connected terminal is then read at block 326. The program continues as shown in FIG. 6C at block 400 wherein a RESTORE LOAD command is generated and transmitted to the connected terminal. The FCT again reads the status of the relays of the connected terminal at block 402 and lights the appropriate GO or NO-GO LED 92b for each relay.

At block 406 a check is made to determine if the status of the relays in block 326 is different from that of block 402. If the statuses are not different, this indicates that the SHED LOAD or LOAD RESTORE commands were not successfully executed and the appropriate NO-GO LED of test status indicator 92a is energized. At block 410, the program enters a WAIT state looking for the next keyboard entry.

If the status of the relays as determined by blocks 326 and 402 is different, the SHED LOAD and LOAD RESTORE commands were successfully executed, and the GO LED of indicator 92a is energized. Next, the FCT checks the DCT flag to see if the connected terminal is a DCT. If so, program control branches to block 500 on FIG. 6D. Otherwise the program continues at block 414 where the FCT generates and transmits to the connected terminal a command for the registers of the associated watthour meter 26 to be read by the connected terminal and transmitted back to the FCT. In block 416, the meter reading as received from the connected terminal is presented on the display 88. The program then enters a WAIT state at block 418.

Returning to block 202 on FIG. 6A, if the device connected to the FCT is a distribution and control terminal (DCT) 29 then the DCT flag is set at block 222. Program control transfers to block 300 of FIG. 6B to perform the same tests as for the interactive terminal 24. At block 413 of FIG. 6C, a check is made to determine if the DCT flag is set. Since it is, program control transfers to block 500 of FIG. 6D. There the program calls for the operator to enter the code for the analog test source which is desired to be generated. At block 502, this analog source is connected to the connected load management terminal. The program then generates a READ ANALOG INPUT command and transmits it at block 504 to the connected terminal. The terminal then reads its analog input and transmits the digitized value back over the powerline to the FCT. At block 506, the FCT displays the received analog value and enters a wait state at block 508.

It can be seen that the disclosed embodiment provides electric utility system load management apparatus having increased capability and reliability over the prior art. While a preferred embodiment of the present invention has been disclosed hereinabove, it is to be understood that equivalent and alternative embodiments of this invention may be made without departing from the spirit and scope of the claims.

We claim:

1. Distribution powerline carrier communication apparatus comprising:
    a load management terminal connected to the powerline and deriving power therefrom, said load management terminal comprising a receiver coupled to the powerline for receiving a carrier signal imposed thereon and means connected to said receiver for controlling loads in response to said carrier signals, and
    a test terminal removably connected to said load management terminal and deriving operating power therefrom, said test terminal comprising a test transmitter coupled to the powerline for imposing carrier signals on the powerline, and means connected to said test transmitter for generating test commands to actuate said load control means and for modulating said commands onto carrier signals imposed on the powerline by said test transmitter, whereby said commands are transmitted from said test terminal to said load management terminal solely over the powerline and are received by said receiver to cause actuation of said load control means.

2. Apparatus as recited in claim 1 wherein the powerline runs through said load management terminal, and said test terminal is connected to the powerline through said load management terminal.

3. Apparatus as claimed in claim 2 wherein said load management terminal comprises a first multiple-circuit connector member and said test terminal comprises a second multiple-circuit connector member cooperating with said first connector member to removably establish a plurality of individual circuit connections between said test terminal and said load management terminal, said individual circuit connections including said connection from said test transmitter to said powerline.

4. Apparatus as recited in claim 1 wherein said load management terminal has a unique address whereby each of said load management terminals in a powerline carrier communiction system can be individually accessed by an associated central control station, and
    said test command generating means comprises means for generating said unique address to cause said load management terminal to respond to commands generated by said test terminal.

5. Apparatus as recited in claim 1 wherein said load management terminal is an interactive terminal comprising a load management terminal transmitter coupled to the powerline for transmitting carrier signals over said powerline in response to signals received by said receiver, and
    said test terminal comprises a test receiver coupled to the powerline for receiving signals transmitted by said load management terminal transmitter, and means for testing the accuracy of said load management terminal transmitter signals and for indicating the results of said signal testing to an operator.

6. Apparatus as recited in claim 5 wherein said test terminal comprises means for automatically generating a sequence of test signals for transmission to said load management terminal and for displaying a GO/NO-GO indication to an operator to indicate the results of each test.

7. Apparatus as recited in claim 5 wherein said test terminal comprises means for receiving an operator-entered address value, said test terminal generating and transmitting a signal to a connected load management terminal to cause said load management terminal to generate and transmit a signal containing its unique address to said test terminal, said test terminal comprising means for indicating whether the unique address received from said connected load management terminal is the same as said operator-entered address.

8. Apparatus as claimed in claim 1 comprising a plurality of types of load management terminals each of which requires a separate set of tests to verify the proper operation thereof, and said test terminal comprises means for generating each of said test sets, means for recognizing the specific type of load management terminal connected thereto, means for permitting an operator to select one of said test sets to be performed by said test terminal, and means for indicating to an operator that the test set presently selected is the correct set for the type of load management terminal presently connected.

9. Electric utility system load management apparatus, comprising:
    a central station for generating load management commands and for transmitting said commands over a communications medium,
    a plurality of load management terminals each capable of providing load control functions and comprising a receiver for receiving said load management commands over said communications medium, storage means for storing a unique address whereby each of said load management terminals can be individually accessed by said central station, and INITIALIZATION ENABLE means operable upon activation to cause said storage means to accept a new value of unique address through said receiver; and a field configuration terminal comprising means permitting an operator to enter an address value, a transmitter for transmitting said entered address value over said communications medium, and means adapted for connection to one of said load management terminals for activating said INITIALIZATION ENABLE means, whereby said transmitted address value is accepted by said storage means and becomes the unique address for said connected load management terminal.

10. Apparatus as recited in claim 9 wherein said communications medium comprises the electric utility powerline.

* * * * *